3,210,356
PTERIDINE COMPOUNDS AND PROCESSES
FOR THEIR PREPARATION
Irwin J. Pachter, Erdenheim, and Joseph Weinstock,
Phoenixville, Pa., assignors to Smith Kline &
French Laboratories, Philadelphia, Pa., a corporation of Pennsylvania
No Drawing. Filed Dec. 15, 1961, Ser. No. 159,780
11 Claims. (Cl. 260—251.5)

This invention relates to processes for the preparation of certain novel aminopteridines and to these compounds themselves. In particular our invention is concerned with a novel method for the preparation of 2,7-disubstituted 4,6-diaminopteridines.

The compounds of the present invention are diuretic and hypotensive agents and are accordingly useful in the treatment of edema and hypertension and in conditions characterized by such symptoms. They may be administered in any of the known internal pharmaceutical forms including capsules, tablets, suspensions, solutions and the like.

The compounds themselves may be represented by the following structural formula:

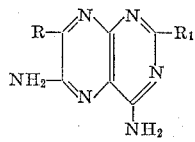

(I)

wherein $R_1$ is amino, phenyl or thienyl and R is phenyl or thienyl.

Included within the scope of this invention are inertly substituted derivatives of the above phenyl groups. Exemplary of such inert substituents are methyl, methoxy, trifluoromethyl and the like. Particularly useful compounds are those wherein R is phenyl and $R_1$ is amino.

These compounds are prepared according to the process of this invention by treating an appropriately 2-substituted-4,5,6-triaminopyrimidine with an α-substituted acetamide derivative of the structure:

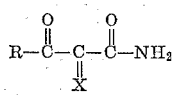

(II)

wherein R is as herein defined and X is

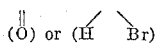

This reaction is represented as follows:

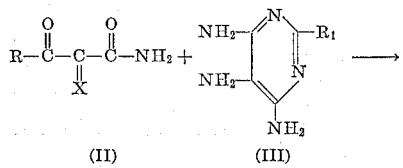

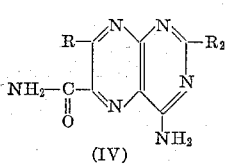

The reaction is advantageously executed under aqueous conditions and the product so formed is readily isolated by neutralization of the resultant acidic reaction medium. The resultant 4-aminopteridine-6-carboxamide is then treated with a hypobromite solution, such as aqueous potassium or sodium hypobromite, to yield the corresponding substituted 4,6-diaminopteridine.

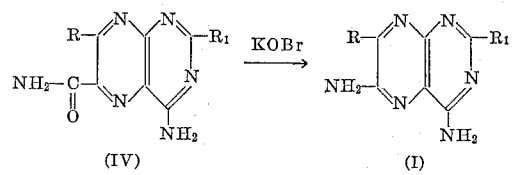

Employing phenyl as R for purposes of exemplification of this process, it can be seen that a suitable intermediate (II) is thus α-bromobenzoylacetamide which may be readily prepared by treating benzoylacetamide with bromine.

Alternatively a triketone of the formula:

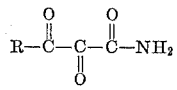

may be employed as the intermediate (II) in the above process. This reagent is generally prepared in situ by treating α-isonitrosobenzoylacetamide with nitrous acid, the 4,5,6-triaminopyrimidine then being added directly to the reaction product. The requisite α-isonitrosobenzoylacetamide can be readily prepared by treating benzoylacetamide with nitrous acid. Alternatively the corresponding compounds of Formula II wherein R is thienyl are employed as one of the starting reagents.

Those compounds of Formula I wherein $R_1$ represents phenyl or thienyl are alternatively prepared by treating a 4,6-diamino-5-nitroso-2-$R_1$-pyrimidine with benzoylacetamide or thienylcarboxyacetamide in the presence of an alkali metal acetate salt such as potassium acetate. This reaction may be represented as follows:

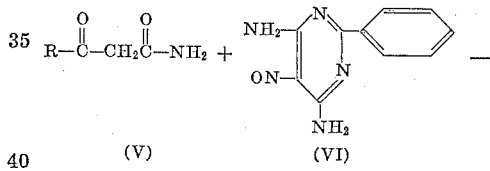

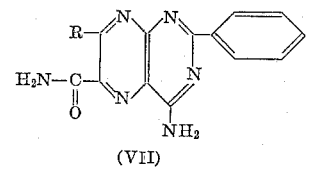

Also within the scope of the present invention are the non-toxic pharmaceutically acceptable acid addition salts of the bases having the structure of Formula I. These salts are readily obtained by treatment of the appropriate base with an inorganic or organic acid. Such acids include for example, hydrochloric, hydrobromic, sulfuric, acetic, benzoic, citric, tartaric and the like. These salts occur in some cases in the hydrate form.

It can thus be seen that the present invention relates to a process for the preparation of heretofore unknown pteridine derivatives. It is apparent that the methods herein described may be varied within the skill of the art without departing from the spirit of the present invention.

The following examples will serve to further typify the nature of the invention. These examples, however, should not be construed as limiting the scope of the present invention, the scope being defined solely by the appended claims.

*Example 1*

To a solution of 32.6 g. (0.2 mole) of benzoylacetamide in 450 ml. of chloroform is added in a dropwise fashion 32.0 g. (0.2 mole) of bromine in 50 ml. of chloroform, maintaining a temperature from 10 to 15° C. during the addition. The mixture is stirred and the hydrogen bromide which evolves is removed by passing a stream of air over the surface of the solution. After completion of the addition, the stirring is continued for 20 minutes and the solvent them removed in vacuo. The residue is recrystallized from ethanol to yield α-bromo-benzoylacetamide, M.P. 123–124° C.

A mixture of 4.0 g. of 4,5,6-triamino-2-phenylpyrimidine and 5.0 g. of α-bromobenzoylacetamide is refluxed in 150 ml. of water for one hour. At the end of this time, the reaction mixture is cooled and the solid which forms is collected by filtration and recrystallized from ethanol to yield 4-amino-2,7-diphenylpteridine-6-carboxamide, M.P. 325–327° C.

To an ice-cold solution of 8.7 g. of potassium hydroxide in 75 ml. of water are added 4.1 g. of bromine in 40 ml. of water. The resultant solution of potassium hypobromite is employed to treat 8.8 g. of 2,7-diphenyl-4-aminopteridine-6-carboxamide in 50 ml. of dimethylformamide. The suspension which forms is warmed to 50° C. and then allowed to stand at room temperature for two hours. The suspension is then warmed on a steam bath for two hours. At the end of this time, the reaction product is collected and extracted with boiling dilute hydrochloric acid, these acidic extracts are then neutralized with ammonia and the solid thus formed recrystallized from dimethylformamide to yield 4,6-diamino-2,7-diphenylpteridine, M.P. 275–277° (dec.)

*Example 2*

To a solution of 5.0 g. of benzoylacetamide in 16 ml. of glacial acetic acid is added in a dropwise fashion with stirring, a solution of 2.3 g. of sodium nitrite in 4 ml. of water at a temperature below 10° C. Stirring is continued for 30 minutes after addition. The mixture is then diluted with 30 ml. of ice-water and cooled for three hours. The solid which forms is collected by filtration and recrystallized from ethanol to yield α-isonitrosobenzoylacetamide, M.P. 148–149° C.

To a solution of 0.5 g. of α-isonitrosobenzoylacetamide in 100 ml. glacial acetic acid is added with stirring 0.69 g. of sodium nitrite in 3 ml. of water. During the addition, the temperature is maintained in the range of from 10 to 15° C. At the end of this time, the reaction mixture is allowed to stand at room temperature overnight. There is then added 0.5 g. of 2-phenyl-4,5,6-triaminopyrimidine and the mixture then warmed at steam bath temperature for 10 to 15 minutes. Ten milliliters of water are then added and the solution cooled. The solid which forms is collected by filtration and recrystallized from dilute acetic acid. Further recrystallization from ethanol then yields the product 4-amino-2,7-diphenylpteridine-6-carboxamide, physical properties substantially as described in Example 1. This product is then treated with potassium hypobromite as heretofore described to yield 4,6-diamino-2,7-diphenylpteridine.

Alternatively a mixture of 2.41 g. (0.015 mole) of benzoylacetamide, 2.15 g. (0.01 mole) of 4,6-diamino-5-nitroso-2-phenylpyrimidine, and 1.96 g. (0.02 mole) of potassium acetate in 100 cc. of alcohol is refluxed for six hours. The mixture is then cooled and filtered to yield 2.2 g. of 4-amino-2,7-diphenylpteridine-6-carboxamide which is treated with potassium hypobromite as described above to yield 4,6-diamino-2,7-diphenylpteridine.

*Example 3*

A mixture of 5,6 g. (0.04 mole) of 2,4,5,6-tetraminopyrimidine and 9.6 g. (0.4 mole) of α-bromobenzoylacetamide (prepared as described in Example 1) is heated at reflux in 250 ml. of water for six hours. At the end of this time, the hot reaction mixture is filtered and the fiiltrate neutralized with ammonia. The solid which forms upon cooling is collected by filtration and suspended in 5% hydrochloric acid. This suspension is warmed gently at steam bath temperatures and filtered. The solid thus collected is suspended in water and neutralized with ammonia. The crystals which form are collected by filtration and recrystallized from dimethylformamide. The crystals so obtained retain a small amount of dimethylformamide which is removed by boiling the material in water for 10 to 15 minutes. Upon collection and drying of these crystals, there is obtained the product 2,4-diamino - 7 - phenylpteridine-6-carboxamide, M.P. 300–302° C.

The solution of potassium hypobromite is prepared from 0.8 g. of bromine and 1.7 g. of potassium hydroxide in a total of 20 ml. of water according to the procedure of Example 1. This solution is then employed to treated 1.4 g. of 2,4-diamino-7-phenylpteridine-6-carboxamide in 6 ml. of dimethylformamide. The mixture is warmed to 50° C. and then allowed to stand at room temperature for two hours. It is next heated at steam bath temperatures for one hour, cooled and treated wtih 5 g. of potassium hydroxide in 5 ml. of water. Heating on the steam bath is continued for an additional hour and the product which separates is collected by filtration. This product is dissolved from dimethylformamide, and water then is added until turbidity occurs. The solution is then cooled and allowed to stand and the product which forms is collected by filtration and dried to yield 2,4,6-triamino-7-phenylpteridine, M.P. 320° (dec.).

*Example 4*

To a solution of 5.0 g. of α-isonitrosobenzoylacetamide in 50 ml. of glacial acetic acid is added a saturated aqueous solution of 7.0 g. of sodium nitrite at 10° C. After completion of the addition, the mixture is cooled in an ice bath for 2½ hours and then allowed to stand in room temperature for two hours. At the end of this time, the mixture is heated gently on a steam bath for about 10 minutes and 3.5 g. of 2,4,5,6-tetraminopyrimidine is added in 1 portion. This mixture is then warmed on a steam bath for 30 minutes and at the end of this time is cooled and neutralized wtih ammonia. The solid so formed is dissolved in dilute hydrochloric acid, filtered and neutralized with ammonia. The material so formed is collected by filtration, recrystallized from dimethylformamide and boiled in water for 10 to 15 minutes. The solid is then collected by filtration and dried to yield 2,4-diamino-7-phenylpteridine-6-carboxamide. This material is then subjected to treatment with potassium hypobromite as previously described to yield 2,4,6-triamino-7-phenylpteridine.

*Example 5*

The following is representative of the preparation of the requisite 2-substituted-3,4,5-triaminopyrimidines.

Dry hydrogen chloride gas is passed into a cooled solution of 54.5 g. of 3-thiophenecarbonitrile in 75 ml. of absolute ethanol and the resulting solution is allowed to stand 48 hours. To the solid is added in several portions an 8% solution of dry ammonia in absolute ethanol containing 12 g. of ammonia. The reaction mixture is shaken for 24 hours, allowed to stand 48 hours and then filtered. The filtrate is then allowed to evaporate to dryness and the residue dissolved in water. This aqueous solution is acidified with concentrated hydrochloric acid, treated with carbon, filtered and concentrated. The crystals which form are isolated by filtration to yield 3-thiophenecarboxamidine hydrochloride.

To a solution 8.1 g. of 3-thiophenecarboxamidine hydrochloride in 80 ml. of methanol is added 11.1 g. of the silver salt of isonitrosomalononitrile. The resulting solution is stirred for 30 minutes and filtered. The filtrate is evaporated to dryness in vacuo and the residue is refluxed wtih 50 ml. of 5-ethyl-2-methylpyridine for twenty minutes. The mixture is cooled, diluted wtih 100 ml. of ethanol and filtered to yield 4,6-diamino-5-nitroso-2-(3-thienyl)-pyrimidine.

4,6-diamino-5-nitroso-2-(3-thienyl)-pyrimidine is then substituted for 4,6-diamino-5-nitroso-2-phenylpyrimidine in the alternative procedure of Example 2. Upon completion of the steps therein described, there is obtained the compound, 4,6-diamino-2-(3-thienyl)-7-phenylpteridine.

Alternatively 4,6 - diamino-5-nitroso-2-(3-thienyl)-pyrimidine is reduced employing sodium hydrosulfate to yield 4,5,6-triamino-2-(3-thienyl)-pyrimidine which when substituted for 4,5,6-triamino-2-phenylpyrimidine in the procedure of Example 1 yields 4,6-diamino-2-(3-thienyl)-7-phenylpteridine.

Following the procedure of Example 1, 4.6 g. of 4,5,6-triamino-2-(3-thienyl)-pyrimidine are substituted for 4,5,6-triamino-2-phenylpyrimidine. There is thus obtained upon completion of the steps therein described, the compound, 4,6-diamino-2-(3-thienyl)-7-phenylpteridine.

*Example 6*

To 10 ml. of thionyl chloride is added 2.5 g. of 3-oxo-3-(2-thienyl)propionic acid. The mixture is allowed to stand for 15 hours at room temperature and the resultant solution evaporated in vacuo at 35° C. The oil so obtained is dissolved in 35 ml. of benzene and the mixture evaporated. This mixture is then held under vacuum to remove any traces of thionyl chloride and the mixture then distilled to yield 3-oxo-3-(2-thienyl)-propionic acid chloride. This material is then shaken with an aqueous solution of ammonia and the resultant mixture extracted with ether. The ethereal extracts are then dried and the solvent evaporated to yield 3-oxo-3-(2-thienyl)-propionamide.

An equivalent amount of 3-oxo-3-(2-thienyl)-propionamide is substituted for benzoylacetamide in the bromination procedure of Example 1. The product, 2-bromo-3-oxo-3-(2-thienyl)-propionamide, is then employed in the procedure of Example 4. There is thus obtained the compound, 2,4,6-triamino-7-thienylpteridine.

We claim:

1. In the process for the preparation of compounds selected from the group consisting of 2,7-disubstituted-4,6-diaminopteridines and the non-toxic acid addition salts thereof, in which said 2,7-disubstituted-4,6-diaminopteridines are of the structural formula:

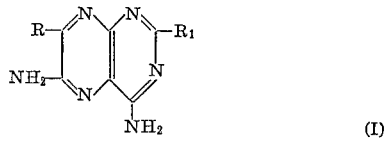

(I)

wherein:

R is a member selected from the group consisting of phenyl and thienyl, and $R_1$ is a member selected from the group consisting of amino, phenyl and thienyl;

the steps which comprise:

(a) treating a 2-$R_1$-4,5,6-triaminopyrimidine with a compound of the structure:

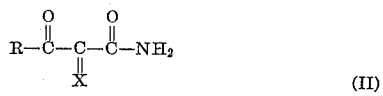

(II)

wherein X is a member selected from the group consisting of

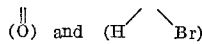

in an aqueous media so as to form a 4-aminopteridine-6-carboxamide of the structure:

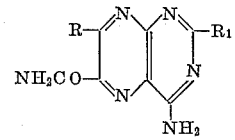

III wherein R and $R_1$ are as heretofore defined, and (b) treating said 4-aminopteridine-6-carboxamide with an aqueous source of hypobromite ions so as to form the 2-$R_1$-7-R-4,6-diaminopteridine (I).

2. The process according to claim 1 wherein X is

3. The process according to claim 1 wherein X is

4. The process for the preparation of 2,4,6-triamino-7-phenylpteridine which comprises treating α-isonitrosobenzoylacetamide with nitrous acid, adding 2,4,5,6-tetraminopyrimidine to the product thereby formed so as form 2,4-diamino-7-phenylpteridine-6-carboxamide and thereafter subjecting said 2,4-diamino-7-phenylpteridine-6-carboxamide to the action of an aqueous source of hypobromite ions.

5. The process for the preparation of 2,4,6-triamino-7-phenylpteridine which comprises treating 2,4,5,6-tetraminopyrimidine with α-bromobenzoylacetamide so as to form 2,4 - diamino-7-phenylpteridine-6-carboxamide and thereafter subjecting said 2,4-diamino-7-phenylpteridine-6-carboxamide to the action of an aqueous source of hypobromite ions.

6. A compound selected from the group consisting of bases of the structure:

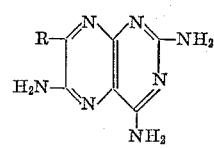

wherein R is selected from the group consisting of phenyl and thienyl and the pharmaceutically acceptable non-toxic acid addition salts thereof.

7. 2,4,6-triamino-7-phenylpteridine.

8. 2,4,6-triamino-7-thienylpteridine.

9. 4-amino-2,7-diphenylpteridine-6-carboxamide.

10. A compound of the formula:

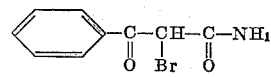

11. A compound of the formula:

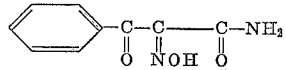

References Cited by the Examiner

UNITED STATES PATENTS 2,667,486   1/54   Cain _____ 260—251.5
2,940,972   6/60   Roch _____ 260—251.5
2,963,481  12/60   Grannells et al. _____ 260—251.5
3,104,242   9/63   Osdene _____ 260—251.5

OTHER REFERENCES

Alles et al., J. Pharm. and Expt. Therap., vol. 72 (1941), p. 265. Lew et al., J. Amer. Chem. Soc., volume 72 (1950), page 5715.

Spickett et al., J. Chem. Soc., London (1954), pages 2887–95.

NICHOLAS S. RIZZO, *Primary Examiner.*

IRVING MARCUS, WALTER A. MODANCE,

*Examiners.*